(12) United States Patent
Burns et al.

(10) Patent No.: US 11,525,667 B2
(45) Date of Patent: Dec. 13, 2022

(54) ELECTRONIC SPECKLE PATTERN INTERFEROMETER (ESPI) FOR LONG-RANGE MEASUREMENT OF DISPLACEMENT OF MATERIALS WITHIN HAZARDOUS ENVIRONMENTS

(71) Applicant: Government of the United States as represented by the Secretary of the Air Force, Wright-Patterson AFB, OH (US)

(72) Inventors: Jennie Burns, San Antonio, TX (US); Joel Bixler, San Antonio, TX (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/335,804

(22) Filed: Jun. 1, 2021

(65) Prior Publication Data
US 2021/0372921 A1    Dec. 2, 2021

Related U.S. Application Data

(60) Provisional application No. 63/033,526, filed on Jun. 2, 2020.

(51) Int. Cl.
*G01B 9/02* (2022.01)
*G01B 9/02015* (2022.01)
(Continued)

(52) U.S. Cl.
CPC ..... *G01B 9/02095* (2013.01); *G01B 9/02028* (2013.01); *G01B 9/02094* (2013.01);
(Continued)

(58) Field of Classification Search
CPC . G01N 2201/06113; G01N 2201/0633; G01N 2201/08; G01B 9/02028; G01B 9/02095; G01B 11/162; G01B 9/02094
See application file for complete search history.

(56) References Cited

U.S. PATENT DOCUMENTS

| 6,043,870 A | 3/2000 | Chen |
| 6,188,482 B1 | 2/2001 | Cloud |

(Continued)

OTHER PUBLICATIONS

Atacha H. The use of laser diodes and monomode optical fibre in electronic speckle pattern interferometry. Proc. SPIE, 1991, 1584: 425-434.

(Continued)

*Primary Examiner* — Violeta A Prieto
(74) *Attorney, Agent, or Firm* — AFMCLO/JAZ; Chastity D. S. Whitaker

(57) ABSTRACT

A digital speckle pattern interferometer (DSPI) is provided for long-range measurement of displacement of materials within a hazardous environments. A test arm of a portion of coherent beam from a laser is aimed at a selected angle to traverse a distance to a test surface. An input collimator has a lens wide enough to receive a reflected beam from the test surface and is focused at a corresponding distance. The reflected beam is combined with a reference beam split from the coherent radiation onto a camera for measuring displacement of the test surface based on an electronic speckle pattern interferometer (ESPI).

6 Claims, 11 Drawing Sheets

(51) Int. Cl.
*G01B 11/16* (2006.01)
*G01N 21/45* (2006.01)

(52) U.S. Cl.
CPC ........... *G01B 11/162* (2013.01); *G01N 21/45* (2013.01); *G01N 2201/0633* (2013.01); *G01N 2201/06113* (2013.01); *G01N 2201/08* (2013.01)

(56) References Cited

U.S. PATENT DOCUMENTS

| | | | | |
|---|---|---|---|---|
| 7,280,187 | B1* | 10/2007 | Yoshida | G01B 11/162 356/512 |
| 8,251,521 | B2* | 8/2012 | Mizushima | H04N 9/315 353/15 |
| 8,269,982 | B1* | 9/2012 | Olczak | G01B 11/162 356/513 |
| 10,228,284 | B2* | 3/2019 | Jeys | G01J 3/2823 |
| 2004/0057054 | A1 | 3/2004 | Toyooka et al. | |
| 2010/0053632 | A1* | 3/2010 | Alphonse | G01B 9/0209 356/491 |
| 2017/0209032 | A1* | 7/2017 | Matsunobu | A61B 1/07 |
| 2018/0328713 | A1* | 11/2018 | Vikhagen | G01H 9/00 |

OTHER PUBLICATIONS

Castellini P, Abaskin V, and Achimova E. Portable electronic speckle interferometry device for the damages measurements in veneered wood artworks. Journal of Cultural Heritage, 2008, 9: 225-233.

Cerecedo-Nunez HH, Padilla-Sosa P, Sanchez-Martinez A, and Rodriguez-Zurita G. Optical fiber characterization for its implementation in speckle pattern interferometry. Proc SPIE, 2007, 6422: 64220M1-6.

Cui D, Bo E, Luo Y, Liu X, Wang X, Chen S, Yu X, Chen S, Shum P, and Liu L. Multifiber angular compounding optical coherence tomography for speckle reduction. Optics Letters, 2017, 42(1): 125-128.

Ford HD, Atcha H, and Tatum RP. Optical fibre technique for the measurement of small frequency separations application to surface profile measurement using electronic speckle pattern interferometry. Measurement Science and Technology, 1993, 4: 601-607.

Fu Y, Pedrini G, Hennelly BM, Groves RM, and Osten W. Dual-wavelength image-plane digital holography for dynamic measurement. Optics and Lasers in Engineering, 2009, 47(5): 552-557.

Kim SJ, Kang YJ, and Choi NJ. Optical-fiber electronic speckle pattern interferometry for quantitative measurement of defects on aluminum liners in composite pressure vessels. Journal of the Optical Society of Korea, 2013, 17(1): 50-56.

Liu W and Tan Y. Singlemode optical fiber electronic speckle pattern interferometry. Optics and Lasers in Engineering, 1996, 25: 103-109.

Mateo J, Losada A, Garces I, and Zubia J. Global characterization of optical power propagation in step-index plastic optical fibers. Optics Express, 2006, 14(20): 9028-9035.

Moore AJ, Hand DP, Barton JS, and Jones JDC. Transient deformation measurement with electronic speckle pattern interferometry and a high-speed camera. Applied Optics, 1999, 38(7): 1159-1162.

Ning YN, Grattan TV, Palmer AW, and Weir K. Measurement of up- and down-lead fiber sensitivity caused by the lead n a multimode fiber in an interferometric system. Applied Optics, 1994, 33(31): 7529-7535.

Paoletti D, Schirripa Spagnolo G, Facchini M, and Zanetta P. Artwork diagnostics with fiber-optic digital speckle pattern interferometry Applied Optics, 1993, 32(31): 6236-6241.

Rodriguez D, Moreno V, Gallas M, Abeleira MT, and Suarez D. In-plane electronic speckle pattern of interference (ESPI) with optical fibre system applied to the study of the human jaw. Medical Engineering & Physics, 2004, 26 371-378.

Rodriguez-Vera R, Kerr D, and Mendoza-Santoyo F. Electronic speckle contouring. Journal of the Optical Society of America A, 1992, 9(11): 2000-2008.

Santos JL, Newson TP, and Jackson DA. Electronic speckle-pattern interferometry using single-mode fibers and active fringe stabilization. Optics Letters, 1990, 15(10): 573-575.

Valera JD and Jones JDC. Phase stepping in fiber-based speckle shearing interferometry. Optics Letters, 1994, 19 (15), 1161-1163.

Welsh H and Culshaw B. Displacement measurements using speckle in multimode fibres. Optical Society of America's 12th International Conference on Optical Fiber Sensors: OSA Technical Digest Series, 1997, 16(OWC42-4): 310-313.

Wu Z, Luo J, Feng Y, Guo X, Shen Y, and Li Z. Controlling 1550-nm light through multimode fiber using a Hadamard encoding algorithm Optics Express, 2019,27(4): 5570-5580.

Zhang J and Chong TC. Fiber electronic speckle pattern interferometry and its applications in residual stress measurements. Applied Optics, 1998, 37(28): 6707-6715.

\* cited by examiner

ELECTRONIC SPECKLE PATTERN INTERFEROMETER (ESPI) FOR LONG-RANGE MEASUREMENT OF DISPLACEMENT OF MATERIALS WITHIN HAZARDOUS ENVIRONMENTS

CROSS-REFERENCE TO RELATED APPLICATIONS

This application claims the benefit of priority under 35 U.S.C. § 119(e) to U.S. Provisional Application Ser. No. 63/033,526 entitled "Electronic Speckle Pattern Interferometer (ESPI) for long-range measurement of displacement of materials within hazardous environments", filed 2 Jun. 2020, the contents of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to remote optical measurements, and more particularly to remote optical measurements of surface properties that are exposed to electromagnetic fields.

2. Description of the Related Art

Strong EM fields interfere with electrical equipment and can result in electrical surges, electrical breakdown and arcing, and thermal and mechanical damage in the equipment—these effects are well known and are often prevented in the design and construction of electronics in industry [1-3]. These fields can be hazardous and potentially lethal for humans [4, 5]; therefore, to ensure safety and improve dosimetry for large-scale, controllable and repeatable laboratory research, the fields are typically contained within anechoic chambers, meaning that the measurement equipment and its ancillary parts placed within these fields must be able to withstand the fields and be remotely operable. To overcome these limitations, researchers regularly use EM interference (EMI) shielding to protect the electrical equipment and wiring inside these environments (e.g., Faraday cages and EMI sleeving); however, EM shields, such as Faraday cages, that are in close proximity to the material under examination can perturb the EM field and the experimental conditions of exposure. In other words, the construction of the equipment (e.g., size, configuration, or use of conductive metals) is also a limitation; therefore, the commercial equipment typically used to measure the mechanics of materials cannot be used in the anechoic chamber during MW/RF exposure. Due to these limitations, the mechanical properties of materials while being exposed to strong MW/RF EM fields have never before been tested.

BRIEF SUMMARY

In one aspect, the present disclosure provides a method that includes coupling a laser beam of coherent radiation into a single-mode fiber. The method includes dividing the coherent radiation by a single-mode fiber optical beam splitter into two fiber-optically contained coherent beams of radiation comprising: (i) a test arm and (ii) a reference arm. The method includes directing the test arm through an output collimator aimed at a first angle from a perpendicular axis to a test surface. The method includes receiving a reflected beam an input collimator having a lens wide enough to receive the reflected beam that has traversed a distance of at least 0.7 m from the test surface, the lens focused at a distance corresponding to the traversed distance. The method includes coupling the received reflected beam into a multi-mode fiber that terminates in a second collimator aimed at a first face of a beam splitter/combiner cube. The method includes combining the received reflected beam with the reference arm aimed at second face of the splitter/combiner cube into a recombined radiation. The method includes aiming the recombined radiation onto a camera. The method includes measuring displacement of the test surface based on an electronic speckle pattern interferometer (ESPI) detected by the camera.

In another aspect, the present disclosure provides a digital speckle pattern interferometer (DSPI) for remote, long-range, nonperturbing and non-invasive assessment of the thermomechanics of materials within strong radio frequency (RF) electromagnetic fields. The DSPI includes a base positionable on a vibration isolating structure. The base includes a laser, a first fiber optic coupler, first fiber beam splitter, single mode fiber, multimode fiber, a second fiber optic coupler, a first output collimator, a splitter/combiner cube, and a camera. The DSPI includes a sensor positionable in a test room exposed to the strong RF electromagnetic fields. The sensor includes a second output collimator aimed at a first angle from a perpendicular axis to a test surface and comprising an input collimator having a lens wide enough to receive a reflected beam that has traversed a distance of at least 0.7 m from the test surface. The lens is focused at a distance corresponding to the traversed distance. The laser produces coherent radiation that is coupled into a first portion of the single-mode fiber by the first fiber optic coupler. The first fiber beam splitter separates the coherent beam into a test arm directed by a second portion of the single mode fiber to the second output collimator and a reference arm directed by a third portion of the single mode fiber to the first output collimator that is directed a first face of the splitter/combiner cube. The input collimator receives a reflected beam from the test surface and couples the reflected beam into the multimode fiber that directs the reflected beam to the second fiber optic coupler that is aimed at a second face of the splitter/combiner cube that combines the reflected beam with the reference arm and directs a combination onto a camera.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DESCRIPTION

Figure 1:
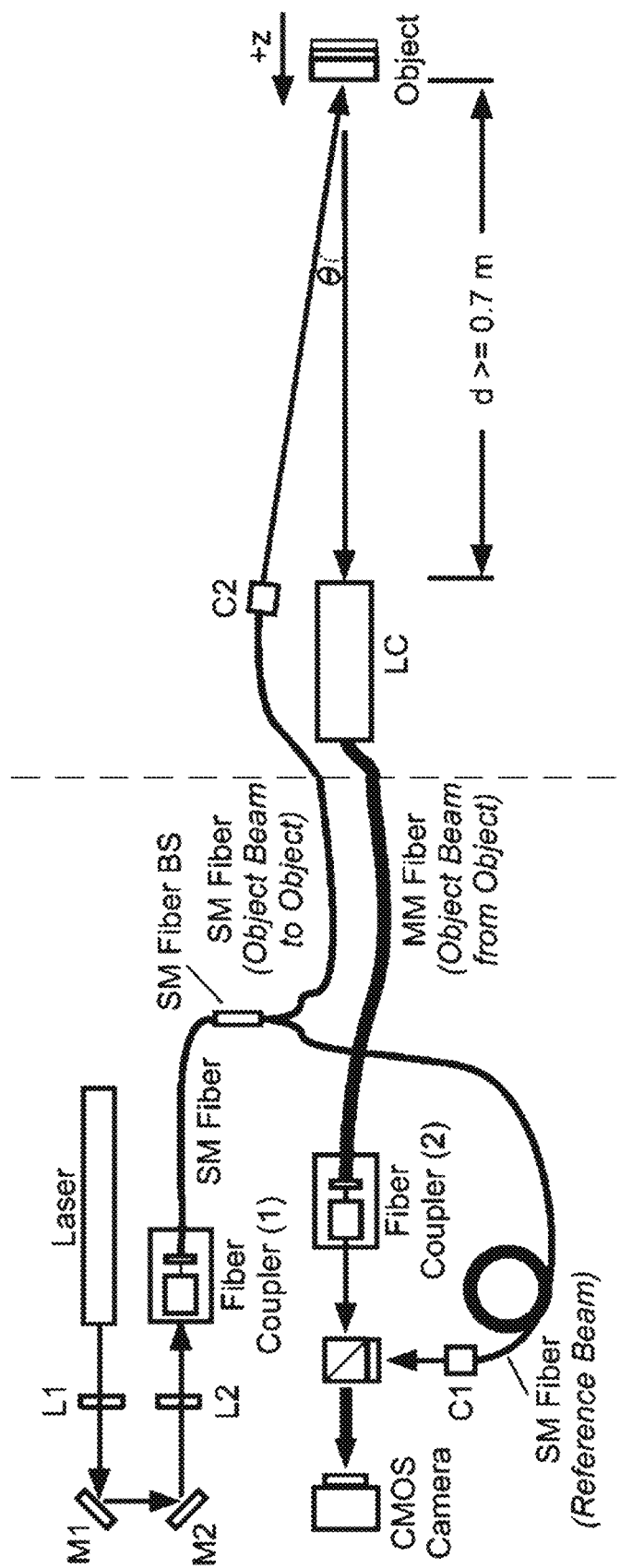
FIG. 1 depicts a top view of an out-of-plane digital speckle pattern interferometer (DSPI) for remote, long-range, nonperturbing and non-invasive assessment of the thermomechanics of materials within strong radio frequency (RF) electromagnetic fields, according to one or more embodiments.

According to aspects of the present innovation, a fiber-optic-based Electronic Speckle Pattern Interferometer (ESPI) is provided for long-range measurements of displacement and topology, and includes device design and methods of use. The purpose of the ESPI is to remotely sense and measure multi-dimensional displacement or movement of materials with high spatial and time resolution, such that the spatial resolution is on scale with the wavelength of the laser source and the time resolution is on the scale of the Nyquist frequency of the frame rate of the high-speed camera used in the design of the ESPI. The ESPI can measure and sense displacement within hazardous environments, such as high-power radio-frequency fields, from long-distance (i.e., with the device placed at a distance>0.7 m from the test material) and with the operator at a remote location (i.e., outside the hazardous environment). The ESPI can produce measurements rapidly and in real-time and is non-contact, non-destructive, and non-perturbing to the test material. The invention could be used to (1) take measurements of material displacement, velocity, acceleration, positioning, stress, strain, linear and volumetric thermal expansion, surface and sub-surface material topology, (2) determine material properties from the measurements (e.g., Young's modulus), (3) take measurements in hard-to-access locations due to small (millimeter-scale) size of measurement probe (i.e., laser beam), and (4) take measurements without perturbing the test material or the environmental or exposure conditions of the test material.

The present innovation solves the need for tool that can remotely sense and measure (with high spatial and temporal resolution) multi-dimensional displacement or movement of test materials within hazardous environments (such as high-power radio-frequency fields) from long-distance (i.e., with the device placed at a far distance from the test material) and with the operator at a remote location (i.e., outside the hazardous environment). This invention also solves the need for a tool that can produce measurements rapidly and in real-time and in a manner that is non-contact, non-destructive, and non-perturbing to the test material. An invention that solves these needs does not currently exist in the commercial marketplace. The invention could potentially pull commercial market demand by companies that produce high precision, optics-based measurement tools.

The innovation could be used in the fields of material science and engineering, electrical, mechanical, and biomedical engineering, biology, chemistry, physics, and medicine. The invention could be useful in a variety of applications that desire high spatial and temporal resolution measurements of displacement and topological imaging. Examples of applications include: (1) measurements of stress and strain in materials that are biological and non-biological (e.g., for predicting areas or points of potential fatigue failure/breakage in materials or for determining the effectiveness of new materials, such as high-thermal stress metal alloys used on space shuttles or synthetic tendons for rotator cuff repair), and (2) mapping of the surface topology of materials and biological tissues, which is useful in the research and development of new materials, understanding physical phenomenon, and in clinical diagnostics.

Prior ESPI designs have incorporated the use of fiber optical cables, primarily single mode fibers, in various positions with a typical EPSI setup and some designs have incorporated the use of a multimode fiber bundle equipped with microlens to capture the radiation reflected from the test material; however, none of these designs are exactly like our design. Our ESPI design uses a single multimode fiber coupled with a long distance focus, large beam collimator to capture the radiation reflected from the test material at long-range distances (>0.7 m). Typical ESPI setups require the test arm to be in close proximity to the test material (i.e. within a few centimeters), which can be perturbing to the environment of the test material, which could ultimately be perturbing to the test material itself.

A fiber-optic-based Electronic Speckle Pattern Interferometer (ESPI) is designed to measure the in-plane and out-of-plane displacement of a surface of a test material in three dimensions. The ESPI uses a laser beam of coherent radiation that is coupled into a single-mode fiber; the coherent radiation is divided within a single-mode fiber-optic beam splitter into two fiber-optically contained coherent beams of radiation known as the "test arm" and "reference arm." The beam of the test arm is terminated with a collimator and the beam outputted by the collimator is aimed at the surface of a test material; the radiation reflected from the test material is collected into a long-distance focus, wide lens collimator (aimed normal to the surface of the test material) and is coupled into a multi-mode fiber that is terminated with another collimator aimed at a beam splitter/combiner cube. The beam splitter/combiner cube recombines the coherent radiation from the test arm and the coherent radiation from the reference arm (which is a single-mode fiber terminated with a collimator) and the recombined radiation is directed onto the sensor of a camera imaging system. The interference pattern fringes of the recombined coherent radiation beams and the number of fringes that move across the sensor of a camera correlates to, and can be used to calculate, the displacement of the test material. The incorporation of fiber optic cables to channel the coherent radiation of the test beam to and from a test material makes the ESPI capable of remotely sensing and measuring (with high spatial and temporal resolution) multi-dimensional displacement or movement of test materials within hazardous environments (such as high-power radio-frequency fields) from long-distance (i.e., with the device placed at a far distance from the test material) and with the operator at a remote location (i.e., outside the hazardous environment). The ESPI can produce measurements rapidly and in real-time and is non-contact, non-destructive, and non-perturbing to the test material. The preferred configuration is in the in-plane and out-of-plane combined configuration such that the test arm's incident beam is outputted via collimators and the test beam. The same large beam collimator can receive both the in-plane and out-of-plane returns sequentially. In one or more embodiments, the setup would be the out-of-plane configuration, but an aperture can be used to block one of the incident beams (essentially switching it into the in-plane configuration) rapidly switching it "back-and-forth" between the in- and out-of-plane configurations sequentially.

Fiber-Optic Based Electronic Speckle Pattern Interferometry for Remote Measurements of Stress and Strain in Biological Materials within High Power Radiofrequency Fields: The present disclosure provides the design, construction, and testing of a fiber-optic, digital speckle pattern interferometer (DSPI) modified for the long-range measurement of displacement, or deformation, of the surface of materials during exposure to strong microwave and radiofrequency (MW/RF) electromagnetic fields in which measurements can be conducted at distances ≥0.7 m between the sensor of the DSPI and the material. The present disclosure presents the theory and calculations, construction, calibration, and use of the DSPI to measure the surface displacements of materials during exposure to strong RF. We exposed polyvinylidene difluoride (PVDF) to continuous-wave 915 MHz RF at a peak power of 75 kW for a duration of 10 s and measured the radial, out-of-plane, surface displacement. The surface displacements were used to calculate the coefficient of thermal expansion and the results were compared to literature. The results of this study show that the DSPI can be used to measure the thermomechanical effects of strong MW/RF exposures (i.e., over a range of frequencies, powers, and pulse durations and repetition rates) to a variety of materials including biological materials. This device will enable us to further our understanding of MW/RF thermomechanical effects and develop better physics-based computational models of these effects.

A DSPI, also known as an electronic speckle pattern interferometer (ESPI), is a type of digital holography interferometer widely used to measure the multi-dimensional displacement, deformation, and vibration of a rough surface of a material [6]. A DSPI can also be used to calculate the derivatives of displacement (e.g., velocity and acceleration), determine a material's properties (e.g., strain, thermal expansion coefficient, Young's modulus, etc.), map surface and sub-surface topology (i.e., contouring), identify defects, and determine the positioning and size of objects [6]. We modified the typical construction of a DSPI such that the light of the object beam reflected off the surface of a material is collected with a large-beam collimator (i.e., a long-distance focus, wide diameter, zoom lens with a focal length ≥0.7 m) and relayed via a multimode fiber outside the anechoic chamber to a beam recombiner for the production of interference fringes when recombined with the reference beam. The interference fringes are imaged and used to calculate surface displacements using image analysis techniques. Because the sensor in a DSPI is its coherent light source (i.e., a laser), measurements of displacement can be taken in a non-contact and non-destructive manner from a long-range distance if the object beam has a power and coherence length that satisfies the distance traversed by the beam. The use of a large beam collimator coupled with a multimode fiber in this setup allows for reflected light from the test material to be captured at long-range distances such that the optics are well outside the main lobe of the MW/RF, the bulk of the setup and the operator are remotely located outside the anechoic chamber, and the fiber-optic cable is not susceptible to EMI. We also chose to use coherent light with a wavelength that would not heat the material under examination. These properties allow measurements to be taken without perturbing the material, the medium surrounding the material (air), or the MW/RF EM fields to which the material is exposed. Our DSPI can also take measurements with high spatial and temporal resolution rapidly and in real time. The spatial resolution is on scale with the wavelength of the laser source (i.e., nanometer spatial resolution) and the temporal resolution on scale with the Nyquist frequency of the sampling rate of the camera sensor used to image the interference fringes.

The field of digital speckle pattern interferometry began in the late 1960's and fiber-optics have been incorporated into the designs of DSPIs since their advent. Although fiber-optic DSPIs are not new in general, the specific design of our fiber-optic DSPI for long-range measurements and its application in studying biological materials exposed to strong MW/RF EM fields are new. The most common and well-known use of fiber-optic DSPI systems are in optical coherence tomography (OCT) devices and their designs can be quite complex. Most DSPIs that have incorporated the use of fiber-optic cables use single-mode (SM) fibers. Usually, the SM fiber is used to carry the coherent radiation either to the first beam splitter (which can be a fiber-optic), is used as the reference arm, is used as the test arm to carry light to the surface of the test material, or is used in combination with the aforementioned references; however, a SM fiber has not been used to carry the reflected light from the surface of the test material due to optical limitations. Instead, usually a camera, sometimes equipped with a zoom lens or a fixed focus lens, is placed in close proximity to the test material [7, 20] or the tip of a multimode fiber bundle equipped with a microlens is placed within a few millimeters (of or directly against) the test material [21, 22]. Some of these DSPIs leveraged phase contrast techniques [7, 12, 14, 17-19] which our setup currently does not use. Some designs have incorporated the use of multimode fibers and fiber bundles to carry light to the first beam splitter cube [23] or as the object arm to carry light to the surface of the test material [24, 25] or to carry a recombined light beam onto a camera sensor [23, 26]. The references listed here are not exhaustive, but are representative of common fiber-optic DSPI designs found in literature.

Only one research group [27] has published a paper containing a fiber-optic DSPI design that most closely resembles the design of our DSPI. Light from a laser source was passed through a beam splitter cube to create the reference and test arms. Each arm was coupled into a single-mode fiber. A multimode image bundle cable (i.e., a 2.5 mm diameter cable made up of many 50 µm diameter multimode fibers) was used to capture the reflected light from the test material via a microlens and carry it to a beam combiner cube. In contrast to our design, they did not appear to use collimators (notably, at the output of the SM fiber of the object arm) and did not use a long-distance focus, wide diameter, zoom lens collimator coupled with a single MM fiber that allows long-range and remote measurements. Their design would still require the tips of the object beam output and input to be in very close proximity (likely within a few centimeters of distance) to the test material. All of the aforementioned designs found in literature require the test material to be in close proximity to the DSPI apparatus (i.e., within a few centimeters) and, apart from the endoscope designs [21, 22], therefore, require the bulk of the apparatus to also be in close proximity to the test material.

In this study, we present the design, construction, and testing of a novel, fiber-optic based, long-range DSPI to measure the out-of-plane displacement (i.e., deformation) of the surface of materials during exposure to strong MW/RF EM fields. We present the theory and calculations of the DSPI, the construction of the DSPI, and the use of the DSPI to measure the surface displacements of materials. We first show that the DSPI can be used to accurately measure known surface displacements using an aluminum plate attached to a motorized micrometer stage. We then show that the DSPI can be used to measure the surface displacement of a material with high dielectric conductivity, polyvinylidene difluoride (PVDF), during the exposure of the material to strong RF at 2.45 GHz at a peak power of 500 kW for a duration of 10 ms. The measured surface displacements were used to calculate strain and the coefficient of thermal expansion and the results were compared to literature. We found that the strain of the PVDF during this exposure was XX and the coefficient of volumetric thermal expansion was approximately XX, which are within XX of literature values. The results of this study show that the DSPI can be used to measure the thermomechanical effects of strong MW/RF exposures (i.e., over a range of frequencies, powers, and pulse durations, numbers, and repetition rates) in a variety of materials, including biological materials. This device will enable us to further our understanding of MW/RF thermomechanical effects and develop better physics-based computational models of these effects.

Materials and Methods—Theory and Calculations:

FIG. 1 depicts a top view of an out-of-plane digital speckle pattern interferometer (DSPI) for remote, long-range, nonperturbing and non-invasive assessment of the thermomechanics of materials within strong radio frequency (RF) electromagnetic fields. A base is placed on an optics table and a sensing arm of the DSPI is inside an anechoic chamber separated by greater than 10 m of fiber-optic cables. L1-L2 are lenses for beam expansion, M1-M2 are alignment mirrors, C1-C2 are collimators, LC is large-beam collimator, BS is beam splitter, SM is single-mode fiber, and MM is multimode fiber.

In DSPI, the surface of a test material (i.e., the object) is illuminated with collimated laser light. There are two DSPI configurations ("in-plane" or "out-of-plane") that can be used to measure surface displacement. In the configuration of FIG. 1, only the "out-of-plane" configuration was used. In the "out-of-plane" configuration, the material is illuminated with a laser beam positioned at a known angle, θ, in relation to the normal direction, to illuminate a point on the surface of the object. The light reflected from the illuminated point on the object in the normal direction is recombined with a reference beam and the speckled moiré pattern produced from the recombination of these beams is imaged with a camera. The "out-of-plane" configuration allows the measurement of surface displacement in the z-direction (i.e., in the normal direction of the illuminated spot on the object out towards the collection lens).

As derived in Hecht [28], the resultant irradiance, $I_R$, of two inferring beams (in this case, the reference beam, $I_1$, and object beam, $I_2$) can be written as:

$$I_R = I_1 + I_2 + 2(I_1 I_2)^{1/2} \cos(\alpha), \quad (1)$$

such that α is the relative phase angle between the phases of the two interfering wavefronts ($\alpha = (\varphi_1 - \varphi_2)$). The relative phase angle, α, arises from a combined path length of, and initial phase angle difference between, wavefronts originating from two point sources overlapping at some distant point in space (e.g., at the sensor of a camera); more specifically, α is equal to $\vec{k}_1 \cdot \vec{r} - \vec{k}_2 \cdot \vec{r} + \varepsilon_1 - \varepsilon_2$ where, if we assume the laser beams are monochromatic, coherent, collimated lightwaves, $\vec{k}$ is the propagation vector of the beam, $\vec{r}$ is the position vector of the wavefront of the beam, and ε is the phase constant of the reflected beam relative to the incident beam. Note that $I_R$, $I_1$, $I_2$, $\varphi_1$, and $\varphi_2$ are functions $\vec{r}$ and time, τ, and that (2) works for both planar and spherical waves. At various points in space, the resultant irradiance depends on a such that a maximum irradiance is obtained when $\cos(\alpha) = 1$ (i.e., when $\alpha = 0, \pm\pi, \pm 4\pi, \ldots$, resulting in total constructive interference) and a minimum irradiance is obtained when $\cos(\alpha) = -1$ (i.e., when $\alpha = \pm\pi, +3\pi, +5\pi, \ldots$, resulting in total destructive interference)—this effect produces a fringe pattern of irradiance when imaged at a cross-sectional plane. According to literature on speckle pattern interferometry [15, 29], for the DSPI, we can use (1) to find the irradiance of the resultant beam at the sensor of the camera where all the variables depend on the (x,y) pixel position on the sensor. In (1) for the DSPI, $I_1$ is the irradiance of the smooth, reference beam and $I_2$ is the irradiance of the speckled object beam, resulting in a speckled fringe pattern (i.e., speckle interferogram) with fringes of intensity, $I_R$.

In our DSPI setup, before measurements were taken, a single background image of the irradiance of the reference beam only was captured on the camera. The DSPI was then prepared for surface measurements by recombining the reference and test beams on the surface of the camera. During the deformation of the object under measurement, a series of speckle interferograms were captured by the camera at a frame rate of 1000 fps. Image processing was used to measure the time-dependent displacement of the surface of the object by subtracting from each speckle interferogram the background image of the reference beam, in order to eliminate background noise, and then by calculating the pixel-wise displacement of the fringes between speckle interferograms. The number of fringes, Δm, that move across a pixel-based area in the speckle interferogram video are used to calculate the out-of-plane (z-direction towards the large-beam collimator) displacement, d, of the surface of the object. If we use small values for the angle, θ, as shown in FIG. 1, such that (cos θ≈1), for the out-of-plane configuration of the DSPI, the z-direction displacement of the object can be calculated as $$d_{out} = \frac{\Delta m \lambda}{1 + \cos\theta}, \quad (2)$$

where λ is the wavelength of the laser beam [15, 30].

Construction: An experimental setup for a DSPI was done in an out-of-plane configuration. The source of the coherent radiation used in the DSPI is a laser. A laser of any wavelength could be used, but in this setup we used a red (λ=632.8 nm) helium-neon (HeNe) gas laser source (Model HNL210L, Thorlabs, Newton, N.J., USA); therefore, all of the fiber-optic cables used in the setup were selected for use with this wavelength laser. The laser cavity emitted coherent radiation through an open aperture and had a fundamental Gaussian profile with a beam diameter, Ø, of 0.7 mm and output power of 22.5 mW. The beam was expanded by 10× magnification using two lens (f=30.0 mm and f=300.0 mm) and reflected from two circular planar mirrors towards the back-end of an infinity-corrected 4× microscope objective (NA=0.1, WD=11.9 mm; Model LI-4X, Newport Corporation, Irvine, Calif., USA) mounted on a fiber launch (Model MBT613D, Thorlabs, Newton, N.J., USA). The objective focused the beam into the FC-connector end of a single-mode, fiber-optic, FC/APC patch cable (Model P5-630A-PCAPC-1, Thorlabs, Newton, N.J., USA). Approximately 12 mW of power was coupled into the fiber as measured with power meters (Power Max Sensor, Model PM3 coupled with a Laser Power Meter, Model PM500AD, Coherent, Inc., Santa Clara, Calif., USA)—not all of the power could be coupled into the fiber due to loss in the system and diffraction limitations. The fiber was connected to a 1×2 narrow-band fiber-optic beam splitter (BS) (λ=632±15 nm, 90-10 split, FC/APC; Model TN632R2A1, Thorlabs, Newton, N.J., USA).

The reference arm of the fiber-optic BS was connected to an 11.1 m single-mode fiber (λ=633-780 nm, NA=0.13, FC/APC, SM600 fiber; custom-made, Thorlabs, Newton, N.J., USA) that was connected to fiber collimation package (633 nm, f=7.93 mm, NA=0.50; Model F240APC-B, Thorlabs, Newton, N.J., USA) to emit a collimated open beam with Ø=1.5 mm. The reference beam was aimed through a neutral density (ND) absorptive filter (ND=3.0; Model NE30A, Thorlabs, Newton, N.J., USA) and into a 50:50 BS cube (non-polarizing, 400-700 nm; Model CCM1-BS013, Thorlabs, Newton, N.J., USA) in order to recombine the reference arm with the test arm. The ND filter was used to match the irradiance of the reference arm to that of the test arm and any ND filter or attenuator could have been used for this purpose.

The test arm of the fiber-optic BS was connected to a 5 m, single-mode, fiber-optic cable (λ=633-780 nm, NA=0.13, FC/APC, SM600 fiber; Model P3-630A-FC-5, Thorlabs, Newton, N.J., USA). The cable was placed through a metal tube (strapped to the surface of the optics table) which passed through a hole in the wall of the RF anechoic chamber and coupled to a fiber collimation package (λ=633 nm, f=18.24 mm, NA=0.15; Model F280APC-B, Thorlabs, Newton, N.J., USA) to emit a collimated open beam with Ø=3.4 mm. The beam was aimed at the test material (e.g., an aluminum plate or plastic sphere) at α=0.59 radian angle from normal. A large-beam fiber collimator (λ=633 nm, f=80 mm, fiber maximum NA=0.25, clear aperture diameter=42.5 mm; Model C80FC-A, Thorlabs, Newton, N.J., USA) was positioned normal to the eye at a distance of 0.7 m from the eye, with 4.7 cm between the two collimators. The large-beam fiber collimator was used to capture the light reflected from the test material at a maximum collimated beam Ø=15.0 mm. The large-beam fiber collimator was connected to a step-index, multimode, fiber-optic cable (λ=400-2400 nm, Ø=200 µm, NA=0.39, FC/PC; Model M72L05, Thorlabs, Newton, N.J., USA). The components of the test arm were secured to an aluminum breadboard positioned on top of a small bench-top vibration isolation platform (Model BT-1620, Newport Corporation, Irvine, Calif., USA) set on the floor of the anechoic chamber. The multimode fiber was passed back through the hole of the RF anechoic chamber and the front-end of an infinity-corrected 10× microscope objective (NA=0.25, WD=12.1 mm; Model LI-10X, Newport Corporation, Irvine, Calif., USA) mounted on a fiber launch (Model MBT613D, Thorlabs, Newton, N.J., USA) to emit a collimated open air test beam with Ø=1.5 mm. The test beam was aimed at the 50:50 BS cube in order to recombine the reference arm with the test arm. The recombined beam emitted from the BS cube was aimed at a CMOS camera (Model acA640-750 um, Basler AG, Ahrensburg, Germany).

The CMOS camera (in this particular setup, the camera settings were: resolution=320×240 pixels (1.55×1.15 mm), pixel format=Mono8, frame rate=1000 fps, exposure=0.9 ms) was used to record images of the speckle pattern interference fringes and changes in those patterns when the surface of the material is displaced. The number of interference fringes that move across the sensor of the camera correlates to, and can be used to calculate, the displacement of the test material. To capture the speckle pattern images and their timestamps, code was custom written in LabVIEW™ software (LabVIEW v.2016, National Instruments, Austin, Tex., USA).

Post-processing and analyses of the images were performed using custom-written code in MATLAB software (MATLAB R2016b, The MathWorks, Inc., Natick, Mass., USA). First, to remove background noise and improve contrast of the fringes, an image taken of only the reference beam (i.e., taken prior to experimentation) was subtracted from all of the images in the experimental image sequence (or video). To eliminate background noise again, for each image in the sequence, the mean intensity of each image was subtracted from that image. Then, the number of fringes that pass by a selected region of interest (ROI) throughout the sequence, Δm, was found using the changes in intensity within the ROI.

Measurement of Known Surface Displacement: To check the accuracy and precision of the DSPI, a flat, rough-surfaced aluminum (Al) plate was attached to a motor-controlled micrometer stage (TST001 T-Cube stepper motor controller and stage, Thorlabs, Inc., Newton, N.J., USA). Prior to the DSPI measurements, increments of distance (0.1 mm and 1.0 mm) traversed by the stage were cross-checked with both a calibrated caliper (0.01 mm resolution, ±0.03 mm accuracy; Model 50001, Chicago Brand Industrial, Inc., Medford, Oreg., USA) and calibrated dial indicator depth gauge (0.001 in (0.0254 mm) resolution; 0 to 1 in (0 to 25.4 mm) range Dial Indicator, Procheck™, Production Tool Supply Company, LLC, Warren, Mich., USA) and found to be ≤1% error (≤10 µm). The surface of the Al plate was positioned perpendicular to the wide-lens collimator (i.e., in the normal direction). The object beam was aimed at the surface of the Al plate.

Figure 2A:
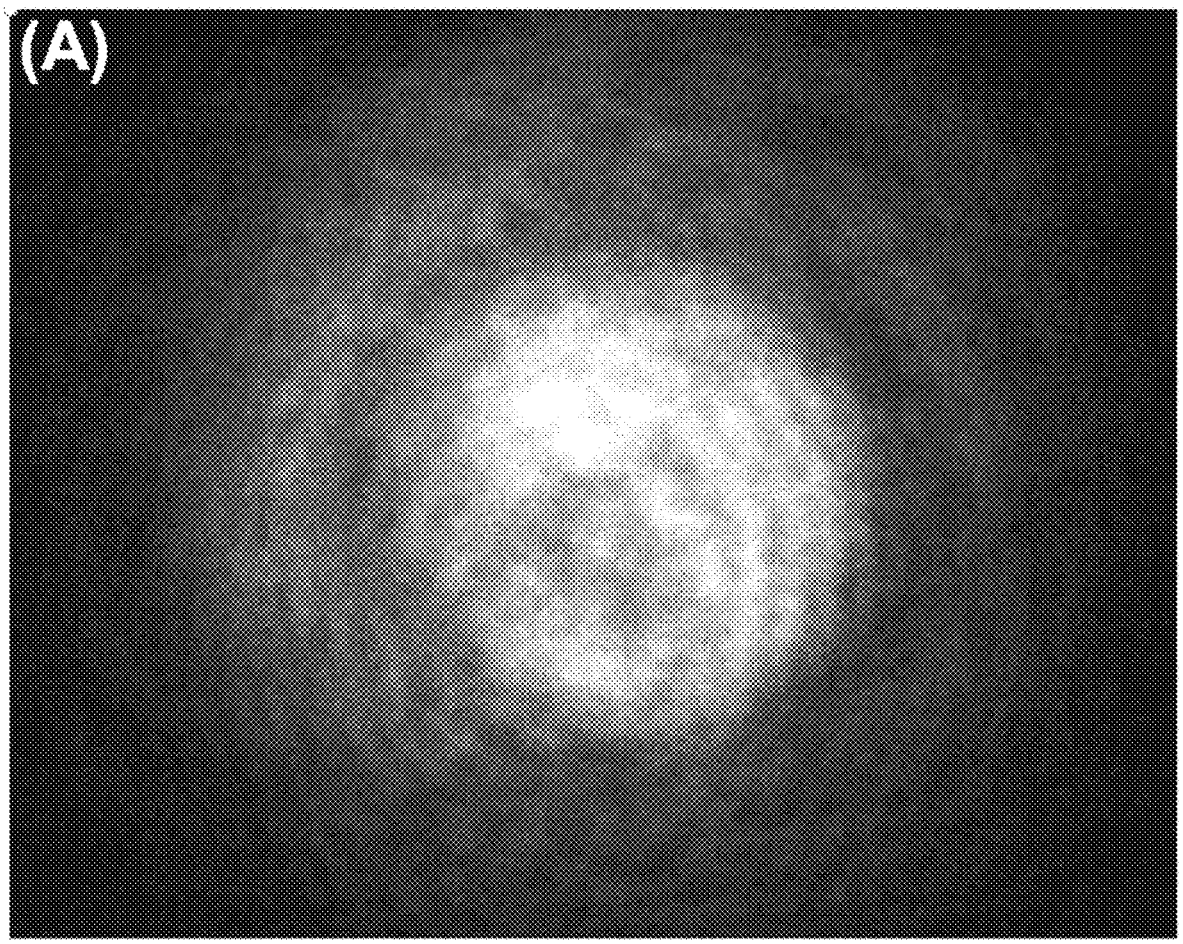
FIG. 2A depicts a photograph of a background image created by a reference beam only that is projected by the out-of-plane DSPI of FIG. 1, according to one or more embodiments.
Figure 2B:
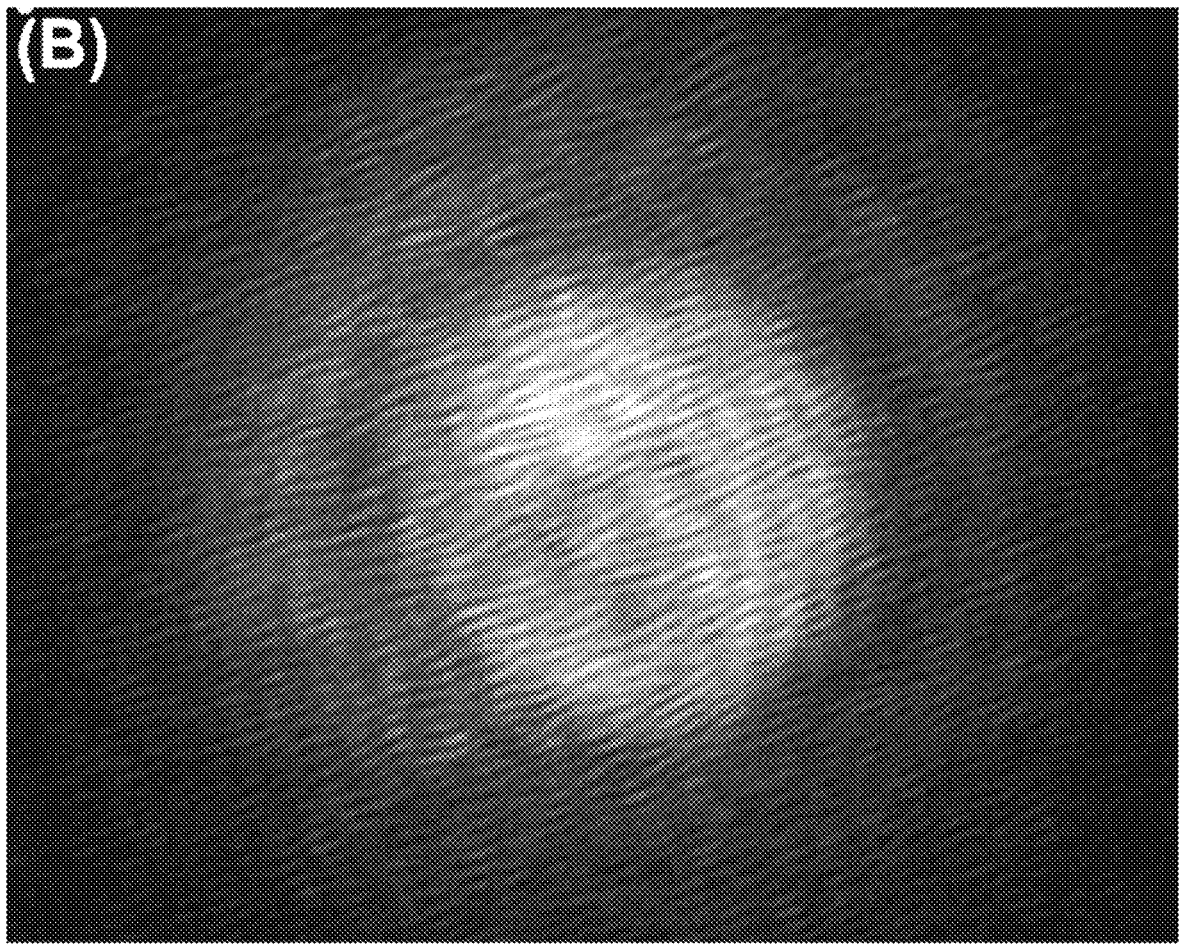
FIG. 2B depicts a photograph of a background image created by the reference beam and an object beam combined to produce a speckle-interferogram that is projected by the out-of-plane DSPI of FIG. 1, according to one or more embodiments.
Figure 2C:
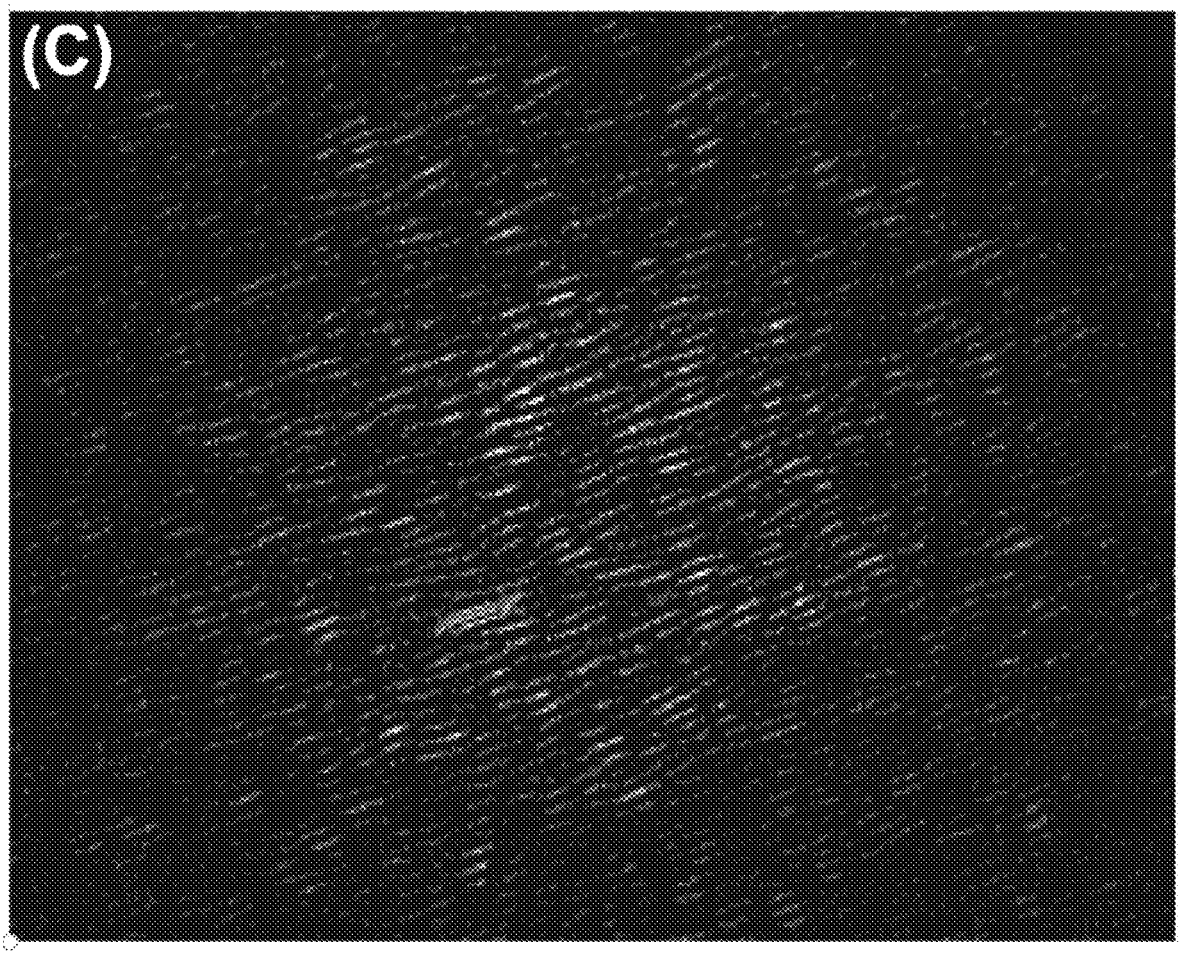
FIG. 2C depicts a photograph of the speckle-interferogram of FIG. 2B minus the background image noise, according to one or more embodiments.
Figure 2D:
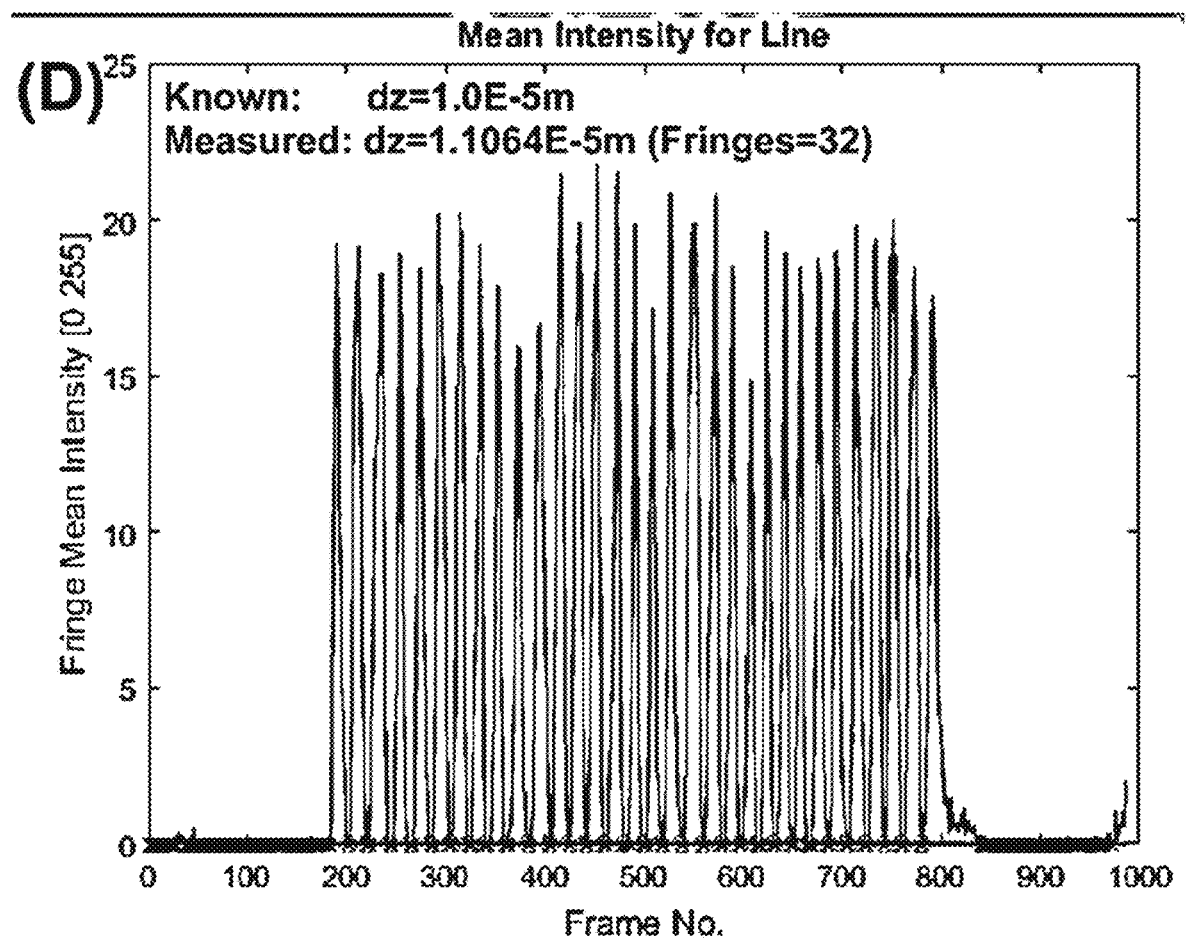
FIG. 2D depicts a graphical plot of mean intensity for line as a function of frame number annotated with measurement calculations, according to one or more embodiments.

FIG. 2A depicts a photograph of a background image created by a reference beam only that is projected by the out-of-plane DSPI of FIG. 1, according to one or more embodiments;

FIG. 2B depicts a photograph of a background image created by the reference beam and an object beam combined to produce a speckle-interferogram that is projected by the out-of-plane DSPI of FIG. 1, according to one or more embodiments;

FIG. 2C depicts a photograph of the speckle-interferogram of FIG. 2B minus the background image noise, according to one or more embodiments;

FIG. 2D depicts the photograph of FIG. 2C annotated with measurement calculations, according to one or more embodiments;

The resolution of our DSPI is dependent on, and equal to, the wavelength of the laser; since we used a HeNe laser, we measured displacements with a resolution of 632.8 nm. The capability of the DSPI to accurately capture the movement of the fringes and calculate displacement is dependent on the frame rate of the camera. The camera must be able to capture each $\lambda/2$ of movement of fringes in each frame to prevent aliasing.

Measurement of Unknown Surface Displacement of Material Exposed to Strong RF: In order to test the effectiveness of the DSPI in measuring the displacement of materials within strong MW/RF fields, we exposed a cube (1×1×1 cm) of PVDF to a single pulse of RF for $\Delta t=10$ ms at $f=2.45$ GHz and $P_{peak}=500$ kW and measured its surface displacement. The material was placed in the anechoic chamber on top of a fiberglass arm.

The dielectric properties, such as electric conductivity ($\sigma$) and relative permittivity ($\varepsilon_r$), of a material are important in calculating the absorption of MW/RF energy and resultant heating of a material. Materials with higher electric conductivities and lower relative permittivities will undergo greater heating in strong MW/RF fields. We chose to use PVDF in this study because it is a solid and has has a. The dielectric and thermal properties of PVDF and other relevant materials can be found in TABLE 1. Therefore, the cube of PVDF is expected to undergo a large thermal volumetric expansion due to heating, whereas the fiberglass materials will not undergo heating and expansion.

TABLE 1

Materials Properties at Room Temperature (20° C.)

| Material | Type | $\sigma$ (S/m) | $\varepsilon'$ (F/m) | $\varepsilon_r$ | tan$\delta$ | $\varepsilon''$ | $C_p$ (J/Kg · C) | $\rho$ (kg/m³) | k (W/m · K) | aL (C⁻¹) |
|---|---|---|---|---|---|---|---|---|---|---|
| air | Gas | 3.00E−15 | 8.86E−12 | 1.0 | 4.00E−04 | 3.54E−15 | 1006 | 1 | 2.60E−02 | 3.40E−03 |
| water, deionized | Liquid | 5.50E−06 | 4.43E−11 | 5.0 | 1.00E−01 | 4.43E−12 | 4186 | 994 | 6.00E−01 | 2.14E−04 |
| PVDF | Solid, Polymer | 1.00E−04 | 7.97E−11 | 9.0 | 5.00E−03 | 3.98E−13 | 1200 | 1690 | 1.10E−01 | 1.28E−04 |
| PVDF Tecaflon ™ | Solid, Polymer | | | | | | | 1772 | 1.85E−01 | 1.27E−04 |
| aluminum | Solid, Metal | 3.82E+08 | 8.85E−11 | 10.0 | 2.00E−03 | 1.77E−13 | 900 | 2699 | XX | 2.10E−05 |
| Fiberglass | Solid, Ceramic | 1.00E−09 | 4.43E−11 | 5.0 | 3.00E−02 | 1.33E−12 | 1255 | 2490 | XX | 2.00E−05 |

Note:

$\sigma$ = electric conductivity, $\varepsilon'$ = dielectric permittivity (or dielectric constant), $\varepsilon_r$ = relative permittivity to vacuum, tan$\delta$ = tangent of loss angle (or loss tangent or dissipation factor), $\varepsilon''$ = dielectric loss factor, C_p = specific heat capacity;

$\rho$ = density, k = thermal conductivity,

α_L = coefficient of linear thermal expansion.

Frequencies at which these material properties are relevant are: 0.9 MHz for air and >1 MHz for deionized water.

Fiberglass is a polyester thermoset resin reinforced with glass fibers.

The PVDF was placed in front of a horizontal, rectangular waveguide (WR-975) and aligned with the center of the waveguide such that the PDVF cube was in the far-field (i.e., the upper edge of the cube was 46 cm from the end of the waveguide). The cube was orientated such that the surface was perpendicular to the wide-lens collimator. The measured surface displacements were used to calculate strain and linear and volumetric thermal expansion and the results were compared to literature.

Figure 3A:
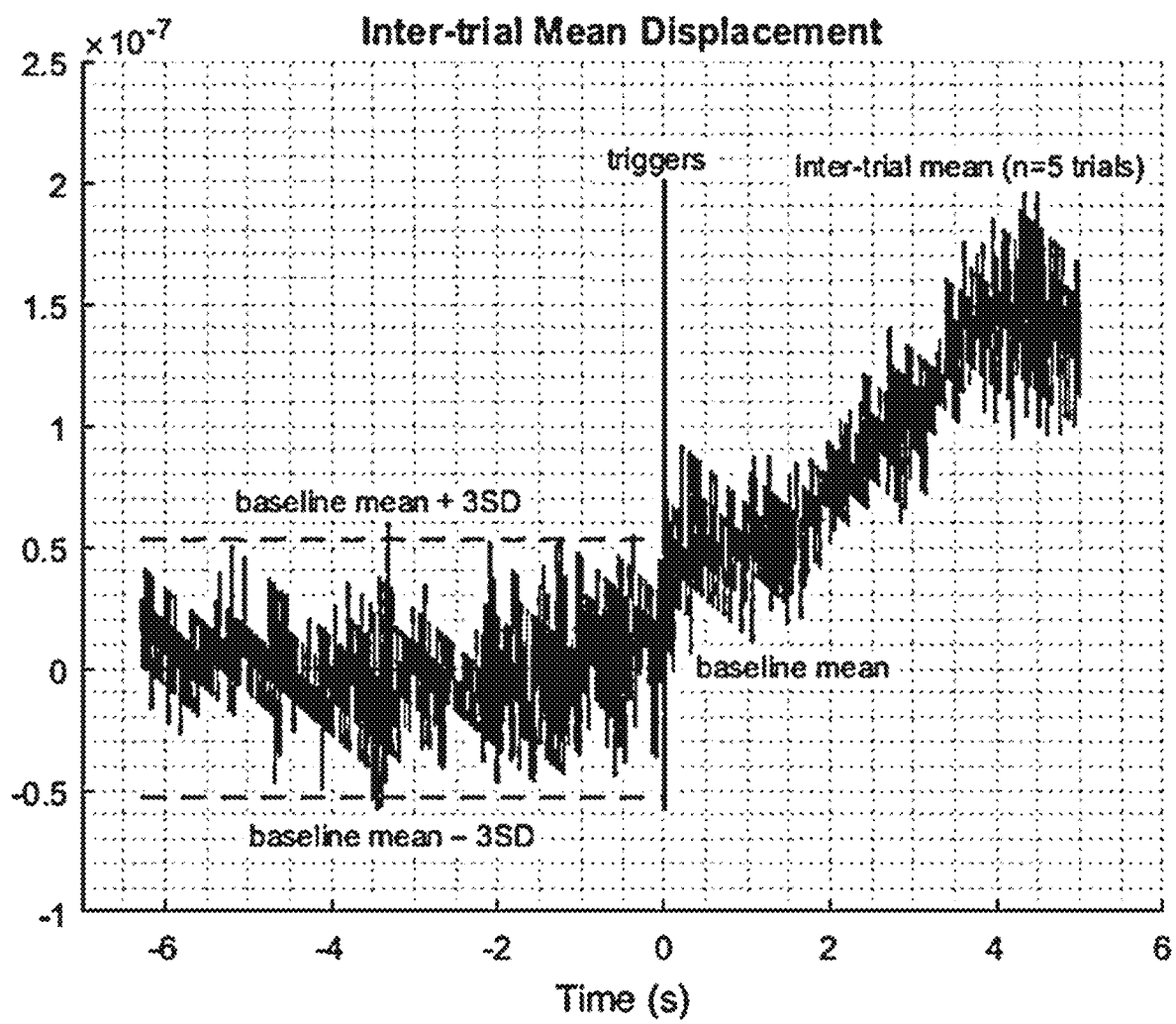
FIG. 3A depicts a graphical plot of inter-trial mean surface displacement as a function of time with RF triggered for a period of time, according to one or more embodiments.
Figure 3B:
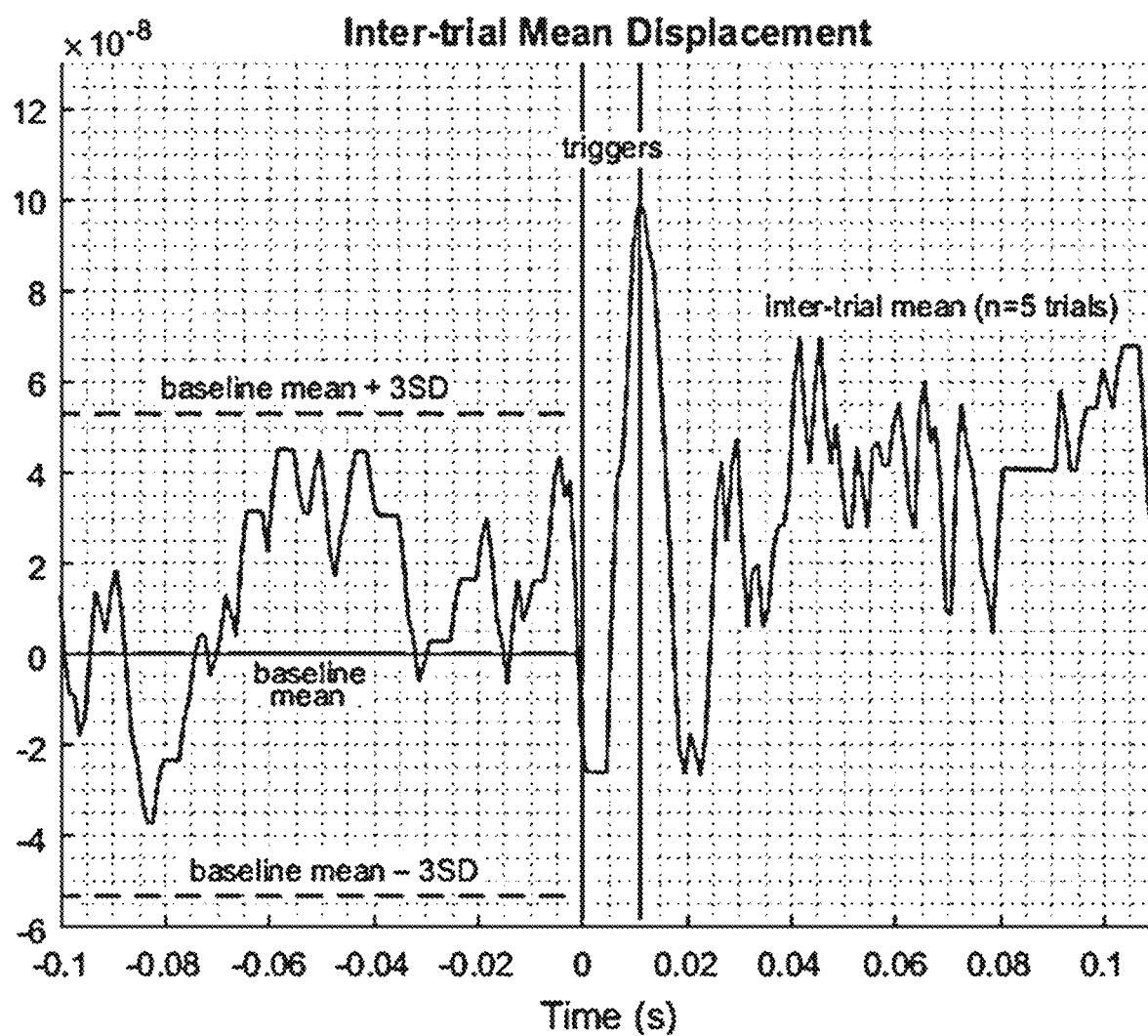
FIG. 3B depicts a graphical plot of FIG. 3A magnified around the start of the RF pulse, according to one or more embodiments.
Figure 3C:
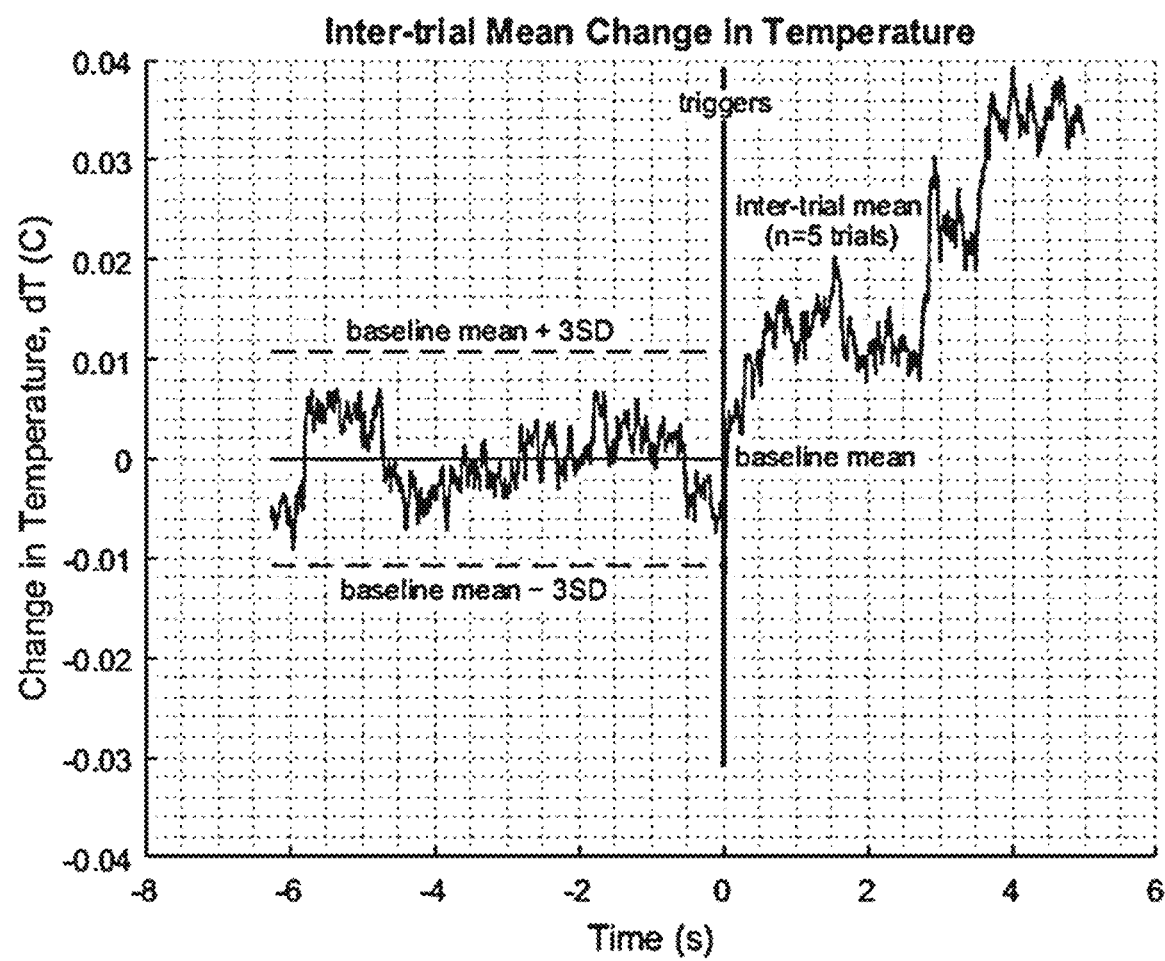
FIG. 3C depicts a graphical plot of inter-trial mean change in temperature as a function of time with RF triggered for a period of time, according to one or more embodiments.
Figure 3D:
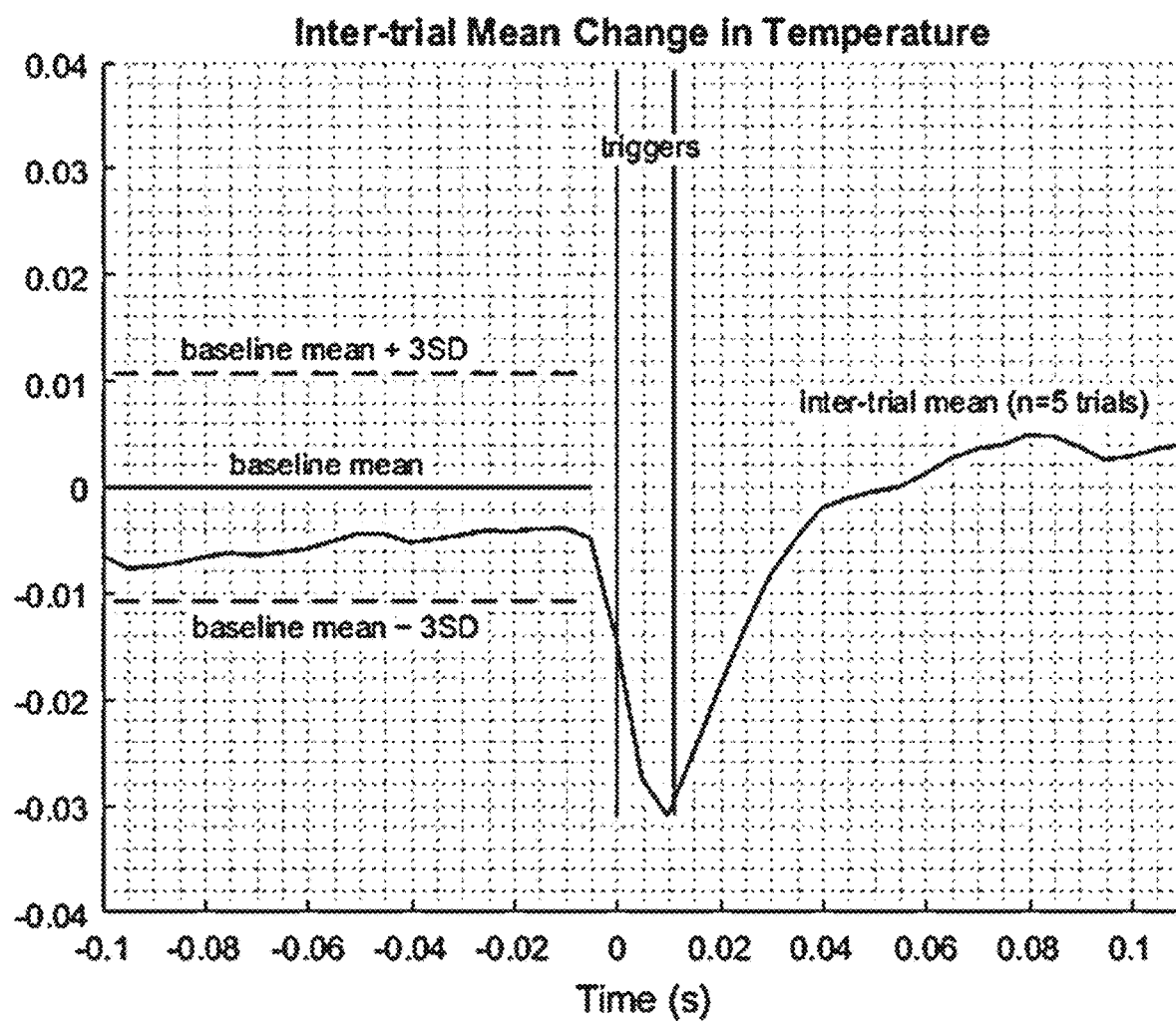
FIG. 3D depicts a graphical plot of FIG. 3C magnified around the start of the RF pulse, according to one or more embodiments.

FIG. 3A depicts a graphical plot of inter-trial mean surface displacement as a function of time with RF triggered for a period of time. FIG. 3B depicts a graphical plot of FIG. 3A magnified around the start of the RF pulse. The change in surface displacement during the RF pulse was 1.14E-7 m. FIG. 3C depicts a graphical plot of inter-trial mean change in temperature as a function of time with RF triggered for a period of time. FIG. 3D depicts a graphical plot of FIG. 3C magnified around the start of the RF pulse.

For a solid material, the coefficient of linear thermal expansion, $\alpha_L$, can be calculated using the following equation:

$$a_L = \frac{\varepsilon}{\Delta T} = \frac{\Delta \ell}{\ell_i \Delta T} = \frac{\Delta \ell}{\ell_i (T_f - T_i)} \quad (3)$$

where $\varepsilon$ is strain, $\Delta \ell$ is the change in length of the object (equivalent to displacement, d), $\ell_i$ is the initial length of the object, and $\Delta T$ is the change in temperature of the object such that $T_f$ is the final temperature and $T_i$ is the initial temperature of the object.

TABLE 2

Coefficients of Thermal Expansion for PDVF.

| PDVF Material @ 2.45 GHz | $\Delta \ell$ (m) | $\ell_i$ (m) | $\Delta T$ (° C.) | $a_L$ (° C.$^{-1}$) |
|---|---|---|---|---|
| Measured by ESPI | 1.14E-7 | 1.27E-2 | 0.035 | 2.56E-4 |
| Measured by Manufacturer | | | | 1.27E-4 |

Figure 4:
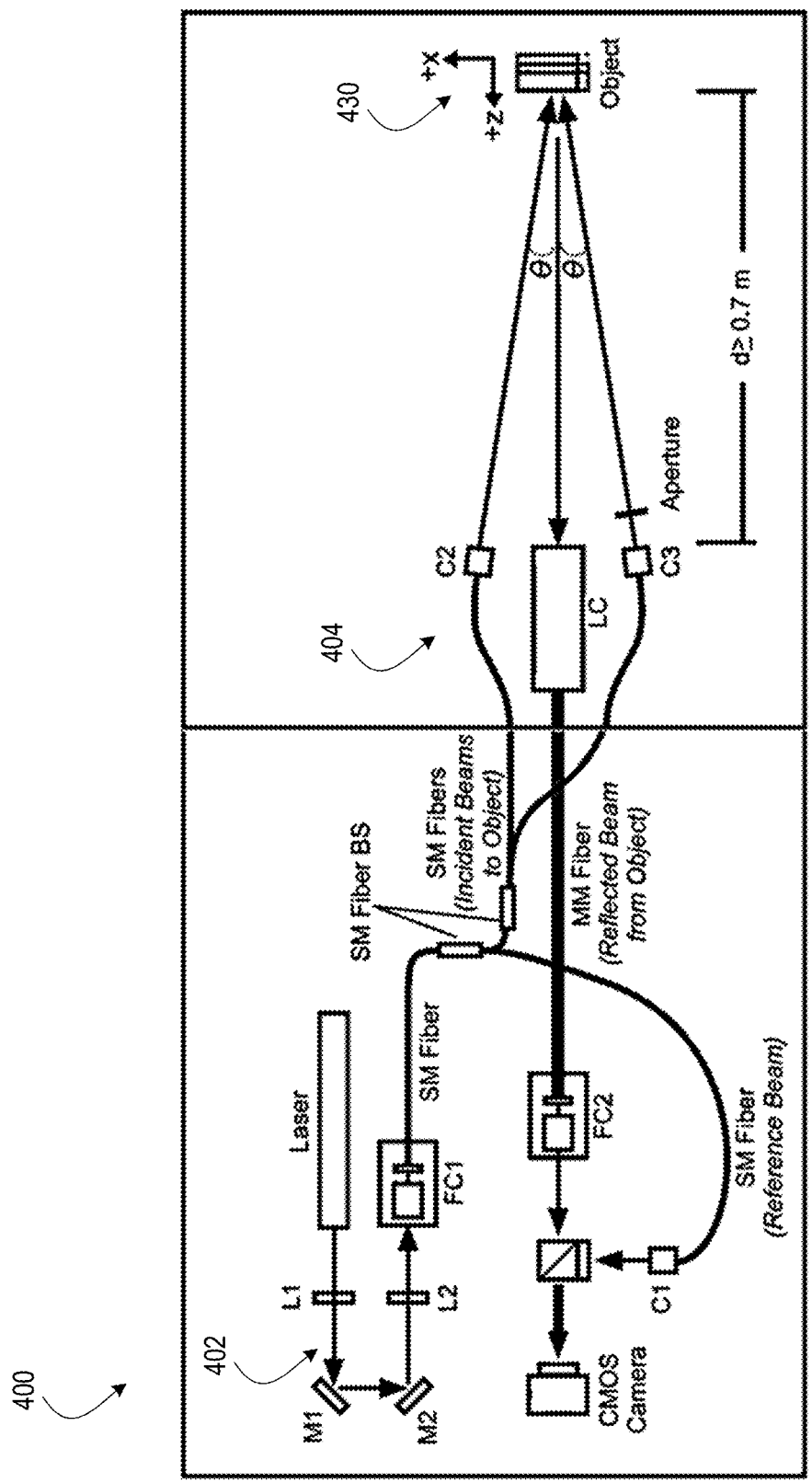
FIG. 4 depicts a top view of an out-of-plane/in-plane DSPI, according to one or more embodiments.

FIG. 4 depicts a top view of an out-of-plane/in-plane DSPI 400. A base 402 of the DSPI 400 is on a vibration isolation optics table and sensing arms ("sensor") 404 can be in a different room separated by a distance via fiber optic cables. The arrows represent the direction of the laser beam except for arrow 430 that represent movement of an object under examination (in the x, y, or z direction). L1 and L2 are lenses for beam expansion. M1-M2 are alignment mirrors. FC1 and FC2 are fiber couplers. C1, C2, C3 are collimators. LC is a large-beam collimators. BS is a beam splitter. SM is a single-mode fiber and MM is multi-mode fiber.

Figure 5:
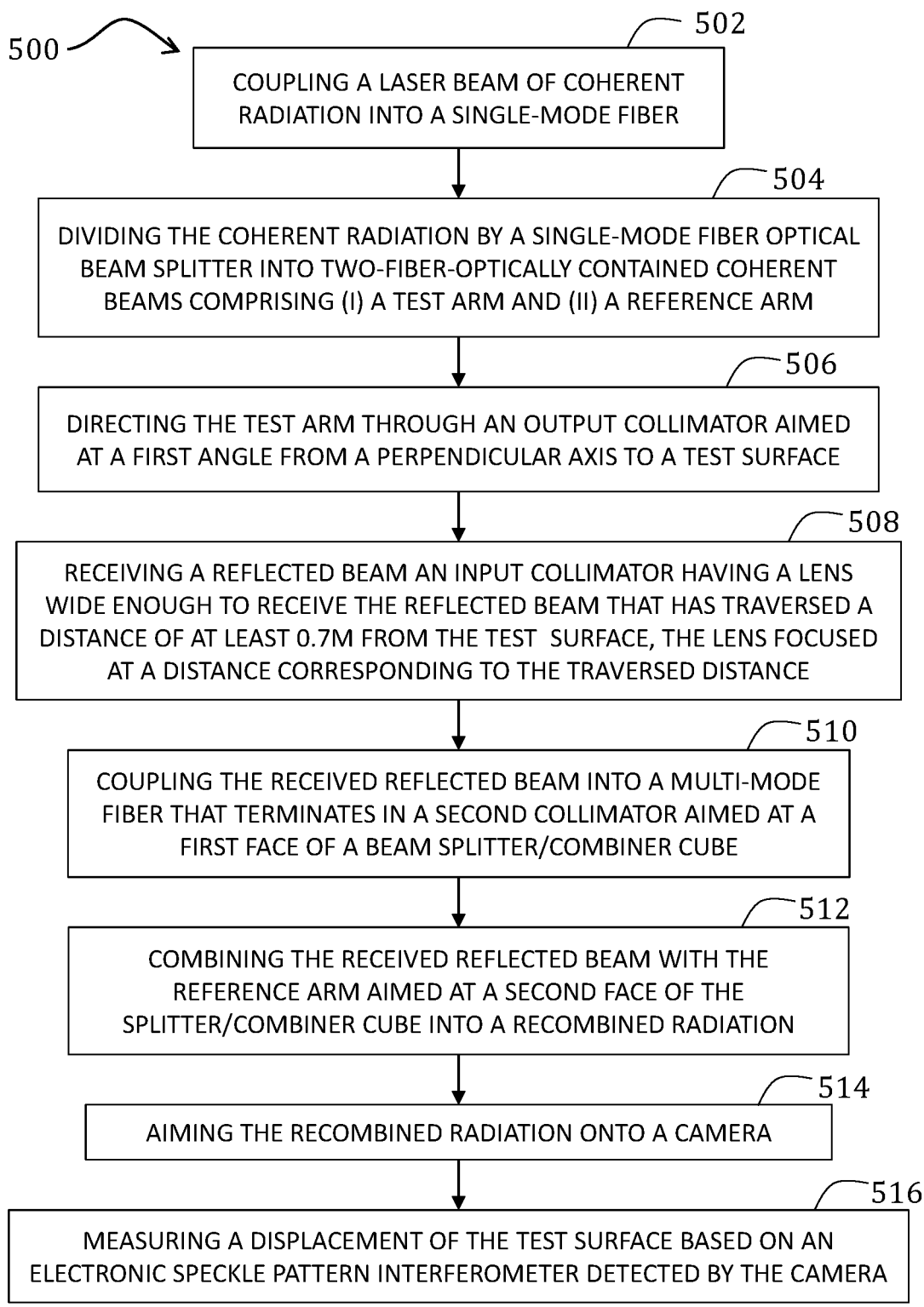
FIG. 5 presents a flow diagram of a method for remote, long-range, nonperturbing and non-invasive assessment of the thermomechanics of materials within strong RF electromagnetic fields using out-of-plane and in-plane DSPI, according to one or more embodiments.

FIG. 5 presents a flow diagram of a method 500 for remote, long-range, nonperturbing and non-invasive assessment of the thermomechanics of materials within strong RF electromagnetic fields using out-of-plane and in-plane DSPI. The method 500 includes coupling a laser beam of coherent radiation into a single-mode fiber (block 502). The method 500 includes dividing the coherent radiation by a single-mode fiber optical beam splitter into two fiber-optically contained coherent beams of radiation comprising: (i) a test arm and (ii) a reference arm (block 504). The method 500 includes directing the test arm through an output collimator aimed at a first angle from a perpendicular axis to a test surface (block 506). The method 500 includes receiving a reflected beam an input collimator having a lens wide enough to receive the reflected beam that has traversed a distance of at least 0.7 m from the test surface, the lens focused at a distance corresponding to the traversed distance (block 508). The method 500 includes coupling the received reflected beam into a multi-mode fiber that terminates in a second collimator aimed at a first face of a beam splitter/combiner cube (block 510). The method 500 includes combining the received reflected beam with the reference arm aimed at second face of the splitter/combiner cube into a recombined radiation (block 512). The method 500 includes aiming the recombined radiation onto a camera (block 514). The method 500 includes measuring displacement of the test surface based on an electronic speckle pattern interferometer (ESPI) detected by the camera (block 516). Then method 500 ends.

In one or more embodiments, the method 500 includes directing the test arm through the output collimator aimed at the first angle from the perpendicular axis to the test surface that is out-of-plane.

In one or more embodiments, the method 500 includes directing the test arm through the output collimator aimed at the first angle from the perpendicular axis to the test surface that is in-plane.

In one or more embodiments, the method 500 includes during a first time period, directing the test arm through the output collimator aimed at the first angle from the perpendicular axis to the test surface that is out-of-plane being greater than zero. The method 500 includes measuring displacement of the test surface based on the ESPI detected by the camera during the first time period. The method 500 includes subsequently during a second time period, directing the test arm through a second output collimator aimed at a second angle from the perpendicular axis to the test surface that is in-plane. The method 500 includes measuring displacement of the test surface based on the ESPI detected by the camera during the second time period.

The following references cited above are hereby incorporated by reference in their entirety:

[1] J. Delmonte, "Radiation Shielding by Metal/Polymer Composites," in Metal/Polymer Composites, ed New York, N.Y.: Springer Science+Business Media, LLC, 1990, pp. 163-86.
[2] B. S. Matisoff, "Radio Frequency and Electromagnetic Shielding," in Handbook of Electronics Packaging Design and Engineering, ed. New York, N.Y.: Van Nostrand Reinhold Company, Inc., 1990, pp. 234-58.
[3] A. Soueid, E. C. Teague, and J. Murday, "EMI/RFI: Electromagnetic and Radio-Frequency Interference," in Buildings for Advanced Technology, ed Switzerland: Springer International Publishing, 2015.
[4] IEEE, "IEEE standard for safety levels with respect to human exposure to radio frequency electromagnetic fields, 3 kHz to 300 GHz," vol. C95.1TM-2005 (Revision of IEEE Std C95.1TM-1991), ed. New York, N.Y.: IEEE, 2006.
[5] IEEE, "IEEE standard for safety levels with respect to human exposure to radio frequency electromagnetic fields, 3 kHz to 300 GHz (Amendment 1)," vol. C95.1TM-2005 (Amendment to IEEE Std C95.1TM-2005), ed. New York, N.Y.: IEEE, 2010.
[6] G. Pedrini, "Holography," in Handbook of Optical Metrology: Principles and Applications, T. Yoshizawa, Ed., ed Baca Raton, Fla.: CRC Press, 2015.
[7] H. Atcha, "The use of laser diodes and monomode optical fibre in electronic speckle pattern interferometry,"

presented at the Proc. SPIE, Fiber Optic and Laser Sensors IX, Boston, Mass., 1991.

[8] H. H. Cerecedo-Nunez, P. Padilla-Sosa, A. Sanchez-Martinez, and G. Rodriguez-Zurita, "Optical fiber characterization for its implementation in speckle pattern interferometry," Proc SPIE, vol. 6422, pp. 1-6, 2007.

[9] D. Cui, E. Bo, Y. Luo, X. Liu, X. Wang, S. Chen, et al., "Multifiber angular compounding optical coherence tomography for speckle reduction," Optics Letters, vol. 42, pp. 125-8, 2017.

[10] H. D. Ford, H. Atcha, and R. P. Tatum, "Optical fibre technique for the measurement of small frequency separations: application to surface profile measurement using electronic speckle pattern interferometry," Measurement Science and Technology, vol. 4, pp. 601-7, 1993.

[11] Y. Fu, G. Pedrini, B. M. Hennelly, R. M. Groves, and W. Osten, "Dual-wavelength image-plane digital holography for dynamic measurement," Optics and Lasers in Engineering, vol. 47, pp. 552-7, 2009.

[12] S. J. Kim, Y. J. Kang, and N. J. Choi, "Optical-fiber electronic speckle pattern interferometry for quantitative measurement of defects on aluminum liners in composite pressure vessels," Journal of the Optical Society of Korea, vol. 17, pp. 50-6, 2013.

[13] J. Mateo, A. Losada, I. Garces, and J. Zubia, "Global characterization of optical power propagation in step-index plastic optical fibers," Optics Express, vol. 14, pp. 9028-35, 2006.

[14] A. J. Moore, D. P. Hand, J. S. Barton, and J. D. C. Jones, "Transient deformation measurement with electronic speckle pattern interferometry and a high-speed camera," Applied Optics, vol. 38, pp. 1159-62, 1999.

[15] D. Paoletti, G. Schirripa Spagnolo, M. Facchini, and P. Zanetta, "Artwork diagnostics with fiber-optic digital speckle pattern interferometry," Applied Optics, vol. 32, pp. 6236-6241, 1993.

[16] D. Rodriguez, V. Moreno, M. Gallas, M. T. Abeleira, and D. Suarez, "In-plane electronic speckle pattern of interference (ESPI) with optical fibre system applied to the study of the human jaw," Medical Engineering & Physics, vol. 26, pp. 371-8, 2004.

[17] R. Rodriguez-Vera, D. Kerr, and F. Mendoza-Santoyo, "Electronic speckle contouring," Journal of the Optical Society of America A, vol. 9, pp. 2000-8, 1992.

[18] J. L. Santos, T. P. Newson, and D. A. Jackson, "Electronic speckle-pattern interferometry using single-mode fibers and active fringe stabilization," Optics Letters, vol. 15, pp. 573-575, 1990.

[19] J. D. Valera and J. D. C. Jones, "Phase stepping in fiber-based speckle shearing interferometry," Optics Letters, vol. 19, pp. 1161-3, 1994.

[20] J. Zhang and T. C. Chong, "Fiber electronic speckle pattern interferometry and its applications in residual stress measurements," Applied Optics, vol. 37, pp. 6707-15, 1998.

[21] B. Kemper, D. Dirksen, W. Avenhaus, A. Merker, and G. von Bally, "Endoscopic double-pulse electronic-speckle-pattern interferometer for technical and medical intracavity inspection," Applied Optics, vol. 39, pp. 3899-905, 2000.

[22] T. Saucedo, F. Mendoza Santoyo, M. De la Torre Ibarra, G. Pedrini, and W. Osten, "Simultaneous two-dimensional endoscopic pulsed digital holography for evaluation of dynamic displacements," Applied Optics, vol. 45, pp. 4534-9, 2006.

[23] Y. N. Ning, T. V. Grattan, A. W. Palmer, and K. Weir, "Measurement of up- and down-lead fiber sensitivity caused by the lead in a multimode fiber in an interferometric system," Applied Optics, vol. 33, pp. 7529-35, 1994.

[24] P. Castellini, V. Abaskin, and E. Achimova, "Portable electronic speckle interferometry device for the damages measurements in veneered wood artworks," Journal of Cultural Heritage, vol. 9, pp. 225-33, 2008.

[25] H. Welsh and B. Culshaw, "Displacement measurements using speckle in multimode fibres," presented at the 12th International Conference on Optical Fiber Sensors: OSA Technical Digest Series, 1997.

[26] Z. Wu, J. Luo, Y. Feng, X. Guo, Y. Shen, and Z. Li, "Controlling 1550-nm light through multimode fiber using a Hadamard encoding algorithm," Optics Express, vol. 27, pp. 5570-80, 2019.

[27] W. Liu and Y. Tan, "Singlemode optical fiber electronic speckle pattern interferometry," Optics and Lasers in Engineering, vol. 25, pp. 103-9, 1996.

[28] E. Hecht, "Interference," in Optics, 4th ed Harlow, Essex: Pearson Education, 2002, pp. 391-448.

[29] M. R. Viotti and A. Albertazzi Jr., "Principles of Digital Speckle Pattern Interferometry," in Robust Speckle Metrology: Techniques for Stress Analysis and NDT, ed Bellingham, Wash.: SPIE Press, 2014, pp. 13-39.

[30] J. B. Brownell and R. J. Parker, "Optical techniques for in-plane strain measurement in an industrial environment," presented at the Proc. SPIE 1084, Stress and Vibration: Recent Developments in Industrial Measurement and Analysis, London, UK, 1989.

What is claimed is:

1. A method comprising:
coupling a laser beam of coherent radiation into a single-mode fiber;
dividing the coherent radiation by a single-mode fiber optical beam splitter into two fiber-optically contained coherent beams of radiation comprising: (i) a test arm and (ii) a reference arm;
directing the test arm through an output collimator aimed at a first angle from a perpendicular axis to a test surface;
receiving a reflected beam an input collimator having a lens wide enough to receive the reflected beam that has traversed a distance of at least 0.7 m from the test surface, the lens focused at a distance corresponding to the traversed distance;
coupling the received reflected beam into a multi-mode fiber that terminates in a second collimator aimed at a first face of a beam splitter/combiner cube;
combining the received reflected beam with the reference arm aimed at second face of the splitter/combiner cube into a recombined radiation;
aiming the recombined radiation onto a camera; and
measuring displacement of the test surface based on an electronic speckle pattern interferometer (ESPI) detected by the camera.

2. The method of claim 1, further comprising directing the test arm through the output collimator aimed at the first angle from the perpendicular axis to the test surface that is out-of-plane.

3. The method of claim 1, further comprising directing the test arm through the output collimator aimed at the first angle from the perpendicular axis to the test surface that is in-plane.

4. The method of claim 1, further comprising:
during a first time period, directing the test arm through the output collimator aimed at the first angle from the perpendicular axis to the test surface that is out-of-plane being greater than zero (0);

measuring displacement of the test surface based on the ESPI detected by the camera during the first time period;

subsequently during a second time period, directing the test arm through a second output collimator aimed at a second angle from the perpendicular axis to the test surface that is in-plane; and measuring displacement of the test surface based on the ESPI detected by the camera during the second time period.

5. A digital speckle pattern interferometer (DSPI) for remote, long-range, nonperturbing and non-invasive assessment of the thermomechanics of materials within strong radio frequency (RF) electromagnetic fields, the DSPI comprising:

a base positionable on a vibration isolating structure and comprising a laser, a first fiber optic coupler, first fiber beam splitter, single mode fiber, multimode fiber, a second fiber optic coupler, a first output collimator, a splitter/combiner cube, and a camera; and a sensor positionable in a test room exposed to the strong RF electromagnetic fields and comprising a second output collimator aimed at a first angle from a perpendicular axis to a test surface and comprising an input collimator having a lens wide enough to receive a reflected beam that has traversed a distance of at least 0.7 m from the test surface, the lens focused at a distance corresponding to the traversed distance, wherein:

the laser produces coherent radiation that is coupled into a first portion of the single-mode fiber by the first fiber optic coupler, the first fiber beam splitter separates the coherent beam into a test arm directed by a second portion of the single mode fiber to the second output collimator and a reference arm directed by a third portion of the single mode fiber to the first output collimator that is directed a first face of the splitter/combiner cube, and the input collimator receives a reflected beam from the test surface and couples the reflected beam into the multimode fiber that directs the reflected beam to the second fiber optic coupler that is aimed at a second face of the splitter/combiner cube that combines the reflected beam with the reference arm and directs a combination onto a camera.

6. The DSPI of claim 5, wherein the base further comprises a second fiber optic beam splitter and the sensor further comprises an aperture and a third output collimator aimed at a second angle from the perpendicular axis to a test surface, wherein one of the first and the second angle is in-plane and the other one of the first and the second angle is out-of-plane, wherein:

the second fiber beam splitter splits the test arm further into a second test arm carried in a fourth portion of the single mode fiber to the third output collimator that is periodically allowed via the aperture to direct the second test arm toward the test surface.

* * * * *